US010153850B2

(12) United States Patent
Aida

(10) Patent No.: US 10,153,850 B2
(45) Date of Patent: Dec. 11, 2018

(54) POWER FEED LINE SWITCHING CIRCUIT, BRANCHING DEVICE, SUBMARINE CABLE SYSTEM, AND POWER FEED LINE SWITCHING METHOD

(71) Applicant: NEC Corporation, Tokyo (JP)

(72) Inventor: Ryuji Aida, Tokyo (JP)

(73) Assignee: NEC Corporation, Tokyo (JP)

( * ) Notice: Subject to any disclaimer, the term of this patent is extended or adjusted under 35 U.S.C. 154(b) by 204 days.

(21) Appl. No.: 14/913,465

(22) PCT Filed: Aug. 20, 2014

(86) PCT No.: PCT/JP2014/004245
§ 371 (c)(1),
(2) Date: Feb. 22, 2016

(87) PCT Pub. No.: WO2015/025518
PCT Pub. Date: Feb. 26, 2015

(65) Prior Publication Data
US 2016/0203930 A1  Jul. 14, 2016

(30) Foreign Application Priority Data
Aug. 23, 2013  (JP) ................................. 2013-173376

(51) Int. Cl.
*H04B 10/80* (2013.01)
*H01H 47/00* (2006.01)
*H04B 3/44* (2006.01)

(52) U.S. Cl.
CPC ......... *H04B 10/808* (2013.01); *H01H 47/002* (2013.01); *H04B 3/44* (2013.01); *H04B 10/806* (2013.01)

(58) Field of Classification Search
CPC ....... H01H 47/002; H04B 3/44; H04B 10/806
See application file for complete search history.

(56) References Cited

U.S. PATENT DOCUMENTS

| 6,157,098 A | * | 12/2000 | Kojima | ................ H04B 10/808 |
| | | | | 307/113 |
| 2003/0015921 A1 | * | 1/2003 | Kumayasu | ............... H04B 3/44 |
| | | | | 307/131 |

FOREIGN PATENT DOCUMENTS

| JP | 8-206271 | 8/1996 |
| JP | 11-186959 | 7/1999 |
| JP | 2001-339413 | 12/2001 |
| JP | 2002-57607 | 2/2002 |
| JP | 2014-31115 | 2/2014 |

OTHER PUBLICATIONS

International Search Report and Written Opinion dated Sep. 16, 2014 in corresponding PCT International Application.

* cited by examiner

*Primary Examiner* — Daniel Cavallari
(74) *Attorney, Agent, or Firm* — Finnegan, Henderson, Farabow, Garrett & Dunner, L.L.P.

(57) ABSTRACT

This power feed line switching circuit for switching connection states among a plurality of power feed lines has a plurality of switching circuits, and a variable resistance unit. The switching circuits switch the connection states among the power feed lines. The variable resistance unit is disposed on the connecting paths among the power feed lines before and after the switching, and the resistance values thereof change in conjunction with operations of the switching circuits.

8 Claims, 7 Drawing Sheets

POWER FEED LINE SWITCHING CIRCUIT, BRANCHING DEVICE, SUBMARINE CABLE SYSTEM, AND POWER FEED LINE SWITCHING METHOD

CROSS-REFERENCE TO RELATED PATENT APPLICATIONS

This application is a National Stage Entry of International Application No. PCT/JP2014/004245, filed Aug. 20, 2014, which claims priority from Japanese Patent Application No. 2013-173376, filed Aug. 23, 2013. The entire contents of the above-referenced applications are expressly incorporated herein by reference.

TECHNICAL FIELD

The present invention relates to a power feed line switching circuit for use in a submarine cable system, a branching device, a submarine cable system, and a power feed line switching method.

BACKGROUND ART

In a submarine cable system, there is known a configuration, in which when a failure has occurred in any of power feed lines for supplying constant direct current to a repeater or to a branching device, a power feed line is switched (power feed lines are re-configured) in order to reduce the area affected by the failure (see e.g. Patent Literature 1 [PTL 1]).

The submarine cable system described in PTL 1 is such that, as illustrated in FIG. 7, repeaters 74 to 76 are disposed between a branching device 70, and each of terminal stations 71 to 73. Further, the branching device 70, and the terminal station devices 71 to 73 are connected by paths 77 to 79 constituting power feed lines, and optical fibers 80 to 82, respectively. In a state that a failure has not occurred in the paths 77 to 79, the path 77 and the path 78 are connected by a power feed line contact circuit (not illustrated) in the branching device 70, and the path 79 and the sea ground are connected. Electric power is supplied to the repeaters 74 and 75 by allowing constant direct current to flow from the terminal station 71 (+) to the terminal station 72 (−) via the paths 77 and 78, and electric power is supplied to the repeater 76 by allowing constant direct current to flow from the sea ground (+) to the terminal station 73 (−) via the path 79.

Next, an operation to be performed when a failure has occurred in a power feed line is explained. For instance, it is assumed that a failure has occurred in the path 78 between the branching device 70 and the terminal station 72.

When a failure has occurred in the path 78, one of the terminal stations 71 to 73 transmits, to the branching device 70, a control signal for switching a power feed line by superimposing the control signal on a signal to be transmitted via the optical fibers 80 to 82. Then, a control unit (not illustrated) in the branching device 70 controls the power feed line contact circuit in accordance with the superimposed control signal for switching the power feed line. Specifically, the path 77 and the path 79 are connected, and the path 78 and the sea ground are connected. In this state, constant direct current is allowed to flow from the terminal station 71 (+) to the terminal station 73 (−) via the paths 77 and 79, whereby electric power is supplied to the repeaters 74 and 76.

Further, in PTL 1, the branching device is provided with a monitoring means which monitors an electrical potential of a switch for switching a power feed line at a branching point, and a monitor signal output means which outputs the electrical potential monitored by the monitoring means to a terminal station via an optical fiber. The terminal station connected to the power feed line is configured such that the power feed line is switched at the branching point by a control signal, while monitoring the electrical potential of the switch at the branching point, which is received through the optical fiber for switching the power feed line. Thus, electrical stress on the switch for switching a power feed line is reduced.

CITATION LIST

Patent Literature

[PTL 1] Japanese Laid-open Patent Publication No. 2002-57607

SUMMARY OF INVENTION

Technical Problem

According to the technique described in PTL 1, it is possible to switch a power feed line at a branching point by remote control, while monitoring an electrical potential of a switch for switching the power feed line at the branching point. However, the technique described in PTL 1 is a technique for reducing electrical stress on a switch for switching a power feed line, and is not a technique for checking whether a switch for switching a power feed line is operated. Thus, there is a problem that it may be impossible to check, from a remote place, whether a switch for switching a power feed line is operated.

Object of Invention

In view of the above, an object of the invention is to provide a power feed line switching circuit that solves the aforementioned problem that it may be impossible to check, from a remote place, whether a switch for switching a power feed line is operated.

Solution to Problem

A power feed line switching circuit according to a first aspect of the invention is a power feed line switching circuit for switching connection states among a plurality of power feed lines. The power feed line switching circuit includes:
a plurality of switch circuits which switch connection states among the power feed lines; and
a variable resistance unit disposed on connecting paths among the power feed lines before and after the switching, and configured such that resistance values of the variable resistance unit are changed in conjunction with operations of the switch circuits.

A power feed line switching method according to a second aspect of the invention is a power feed line switching method performed by a power feed line switching circuit including a plurality of switch circuits which switch connection states among a plurality of power feed lines, and a variable resistance unit disposed on connecting paths among the power feed lines before and after the switching. The method includes:

changing resistance values of the variable resistance unit in conjunction with operations of the switch circuits.

A branching device according to a third aspect of the invention is a branching device to be connected to a plurality of optical fibers to be connected to a plurality of terminal stations, and to be connected to a plurality of power feed lines. The branching device includes:

a power feed line switching circuit which switches connection states among the power feed lines, wherein the power feed line switching circuit includes a plurality of switch circuits which switch the connection states among the power feed lines, and a variable resistance unit disposed on connecting paths among the power feed lines before and after the switching, and configured such that resistance values of the variable resistance unit are changed in conjunction with operations of the switch circuits.

A submarine cable system according to a fourth aspect of the invention includes:

a plurality of terminal stations; and a branching device to be connected to a plurality of optical fibers to be connected to the terminal stations, and to be connected to a plurality of power feed lines, wherein the branching device includes a power feed line switching circuit which switches connection states among the power feed lines, the power feed line switching circuit includes a plurality of switch circuits which switch the connection states among the power feed lines, and a variable resistance unit disposed on connecting paths among the power feed lines before and after the switching, and configured such that resistance values of the variable resistance unit are changed in conjunction with operations of the switch circuits, at least one of the terminal stations includes;

a power feeding unit which supplies constant current to the power feed line interposed between the branching device and the one terminal station, a control signal transmitting unit which transmits a control signal for switching the switch circuits with respect to the branching device, and an electrical potential detecting unit which detects an electrical potential of the power feed line disposed between the branching device and the one terminal station.

Advantageous Effects of Invention

According to the invention, it is possible to check, from a remote place, whether a switch for switching a power feed line is operated.

BRIEF DESCRIPTION OF DRAWINGS

FIG. 6 is a block diagram illustrating a configuration example of a variable resistance unit 12a.

DESCRIPTION OF EMBODIMENTS

Figure 1:
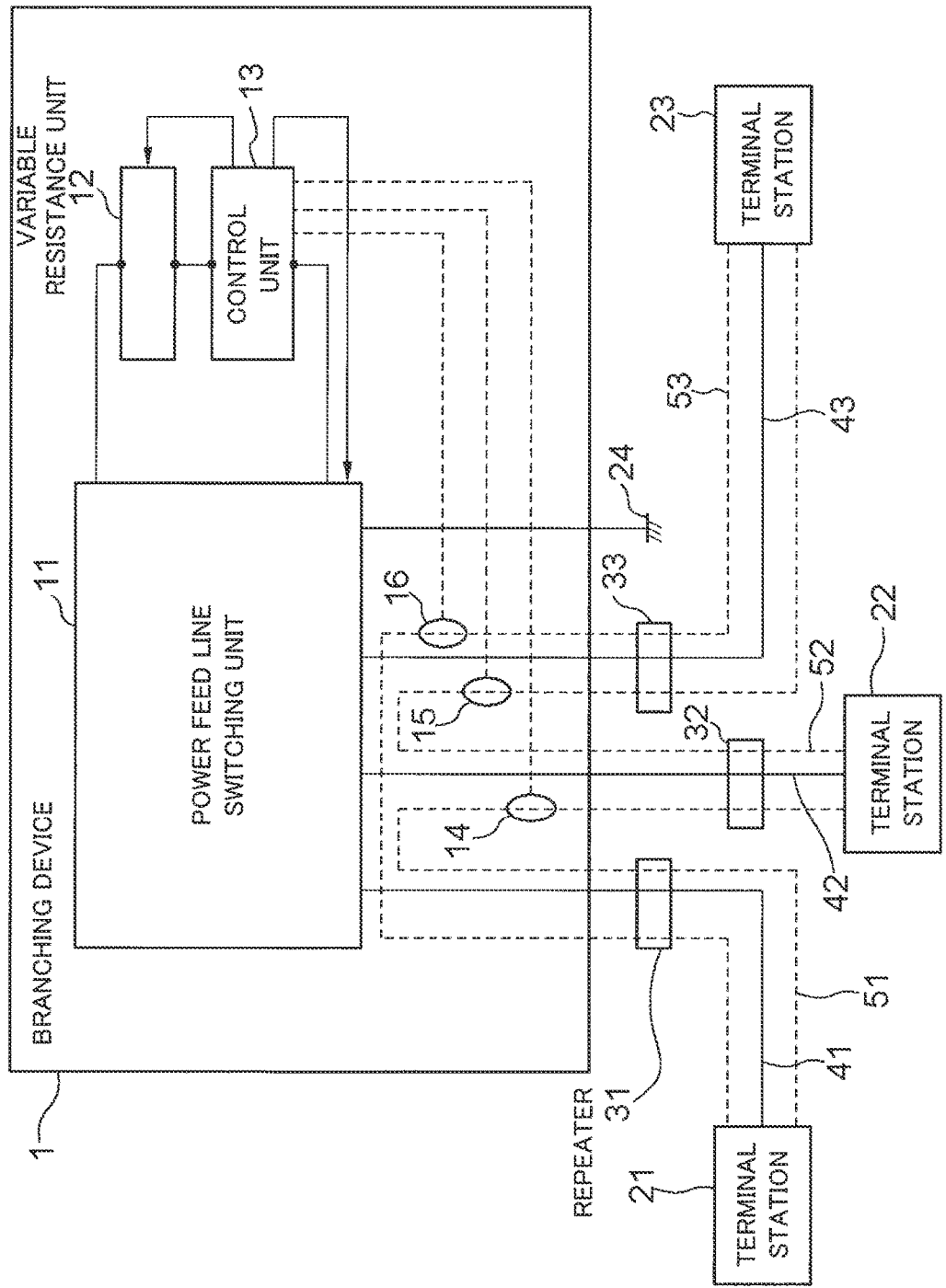
FIG. 1 is a block diagram illustrating a configuration example of a submarine cable system in a first exemplary embodiment of the invention.

Next, exemplary embodiments of the invention are explained in details referring to the drawings.

[First Exemplary Embodiment of the Invention]

Referring to FIG. 1, a submarine cable system in the first exemplary embodiment of the invention is provided with a branching device 1, and terminal stations 21 to 23. The terminal station 21 and the branching device 1 are connected by an optical fiber 51 constituting a signal transmission line, and a path 41 constituting a power feed line. The terminal station 22 and the branching device 1 are connected by an optical fiber 52 constituting a signal transmission line, and a path 42 constituting a power feed line. The terminal station 23 and the branching device 1 are connected by an optical fiber 52 constituting a signal transmission line, and a path 43 constituting a power feed line. The paths 41 to 43 are also called as power feed lines. Repeaters 31 to 33 for amplifying optical signals to be transmitted and received among the terminal stations 21 to 23 via the optical fibers 51 to 53 are disposed between the branching device 1, and each of the terminal stations 21 to 23. Electric power is supplied to the branching device 1 and to the repeaters 31 to 33 via the paths 41 to 43 constituting power feed lines.

The branching device 1 is provided with a power feed line switching unit 11, a variable resistance unit 12, a control unit 13, and photocouplers 14 to 16. Although the branching device 1 has a function of branching the optical fibers 51 to 53, illustration of the function is omitted herein.

The power feed line switching unit 11 switches a power feed line in accordance with control of the control unit 13. Specifically, the power feed line switching unit 11 is connected to four paths i.e. the path 41 connected to the terminal station 21, the path 22 connected to the terminal station 22, the path 43 connected to the terminal station 23, and a path connected to the ground. The power feed line switching unit 11 switches connection states among the paths. The variable resistance unit 12 is interposed in series to a portion of a path (a common path portion) to be commonly used in the path constituting a power feed line before and after the power feed line is switched. The variable resistance unit 12 switches a resistance value in accordance with control of the control unit 13. The photocouplers 14 to 16 are connected to the optical fibers 51 to 53. The photocouplers 14 to 16 extract signals to be transmitted through the optical fibers 51 to 53, and output the extracted signals to the control unit 13. The control unit 13 controls the power feed line switching unit 11 in accordance with a control signal to be transmitted from the terminal stations 21 to 23 via the optical fibers 51 to 53 and via the photocouplers 14 to 16 for switching the power feed line, and controls the variable resistance unit 12 in accordance with the control signal for switching the resistance value.

Figure 2:
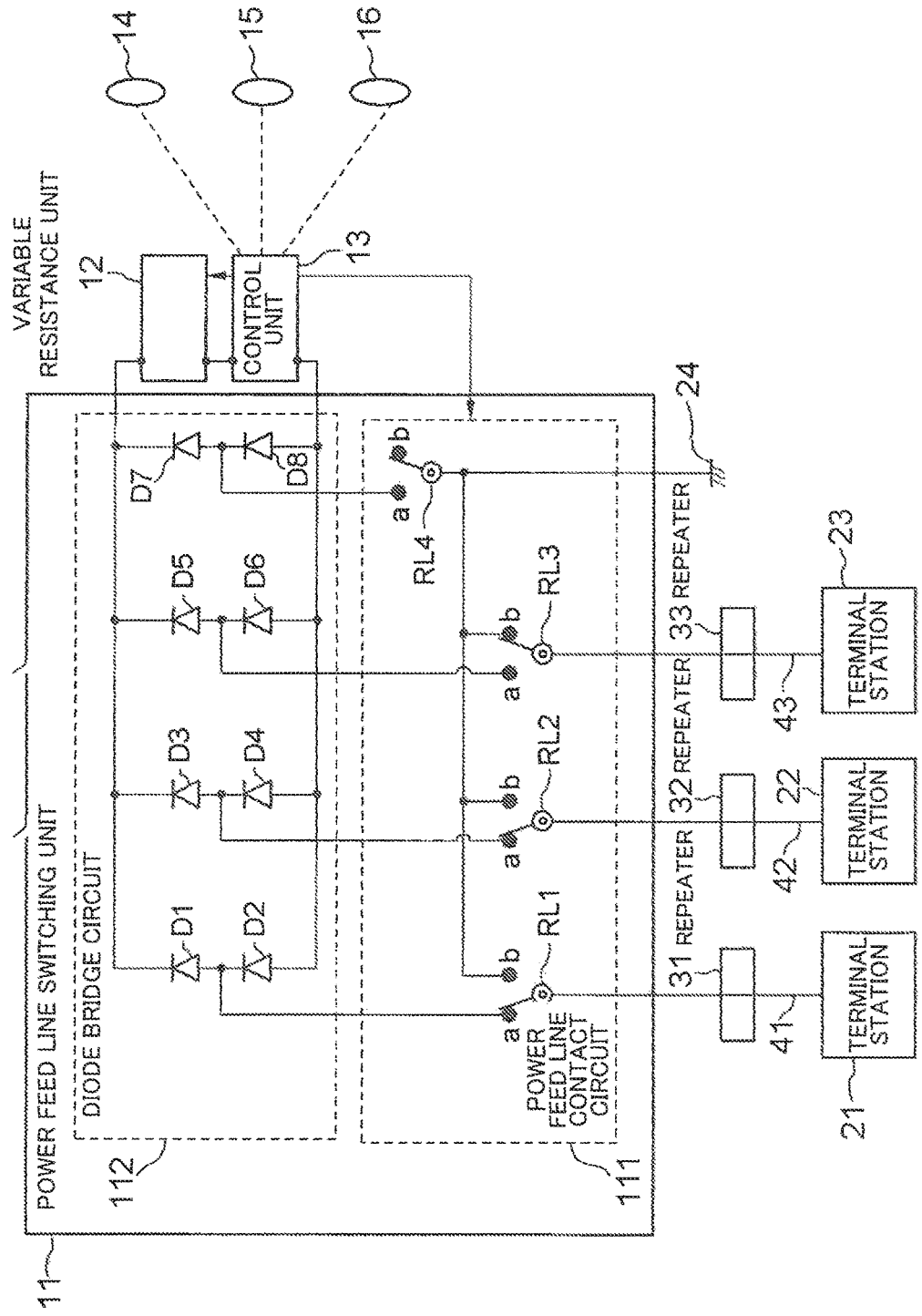
FIG. 2 is a block diagram illustrating a configuration example of a power feed line switching unit 11.

Referring to FIG. 2, the power feed line switching unit 11 is provided with a power feed line contact circuit 111 and a diode bridge circuit 112. The power feed line contact circuit 111 and the diode bridge circuit 112 constitute a part of a power feed line.

The power feed line contact circuit 111 is a circuit for switching a power feed line. The power feed line contact circuit 111 is provided with four relay contacts RL1 to RL4 to be controlled by the control unit 13. The relay contacts RL1 to RL4 are also called as switch circuits. When all the paths 41 to 43 are normally operated, for instance, as illustrated in FIG. 2, the relay contacts RL1 and RL2 are set on a-side, and the relay contacts RL3 and RL4 are set on b-side. Identifiers ID1 to ID4 are given to the relay contacts RL1 to RL4.

The diode bridge circuit 112 is a circuit for supplying constant current in a predetermined direction to the variable resistance unit 12 and to the control unit 13, regardless of the polarities of the terminal stations 21 to 23. The diode bridge circuit 112 has a configuration, in which a first diode pair constituted of diodes D1 and D2 connected to each other in series to face the same direction, a second diode pair constituted of diodes D3 and D4 connected to each other in series to face the same direction, a third diode pair constituted of diodes D5 and D6 connected to each other in series to face the same direction, and a fourth diode pair constituted of diodes D7 and D8 connected to each other in series to face the same direction are connected in parallel. Further, the relay contacts RL1 to RL4 are respectively connected to connection portions between the respective two diodes in the first to fourth diode pairs. Further, a series circuit including the variable resistance unit 12 and the control unit 13 is connected in parallel to each of the diode pairs of the diode bridge circuit 112.

As described above, the relay contact RL1 constitutes a switch circuit for connecting the path 41 to one of the connection point between the two diodes D1 and D2, and the path connected to the ground. The relay contact RL2 constitutes a switch circuit for connecting the path 42 to one of the connection point between the two diodes D3 and D4, and the path connected to the ground. The relay contact RL3 constitutes a switch circuit for connecting the path 43 to one of the connection point between the two diodes D5 and D6, and the path connected to the ground. The relay contact RL4 constitutes a switch circuit for connecting the path connected to the ground to the connection point between the two diodes D7 and D8.

Figure 3:
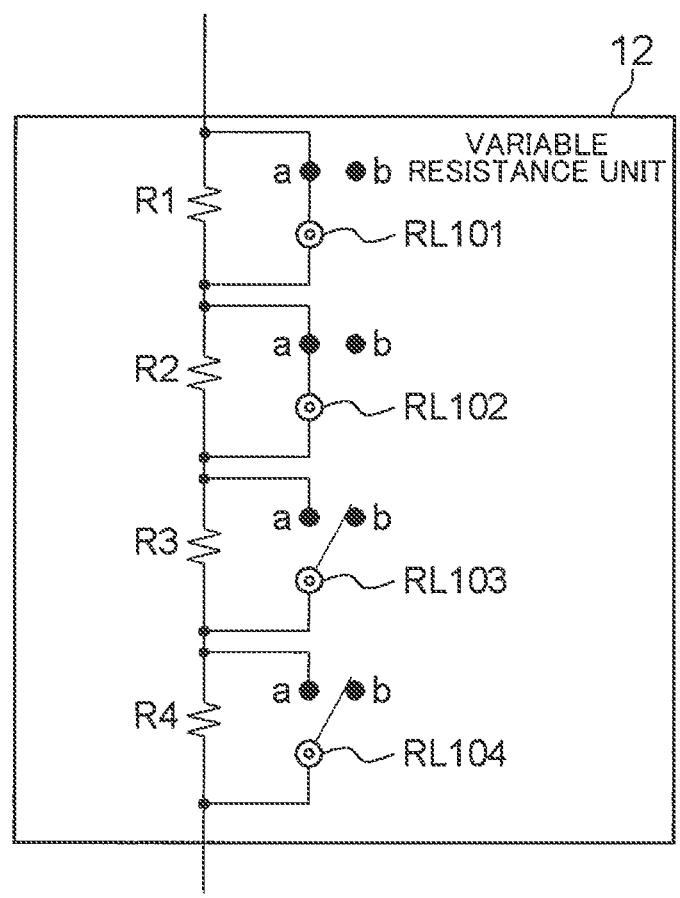
FIG. 3 is a block diagram illustrating a configuration example of a variable resistance unit 12.

Referring to FIG. 3, the variable resistance unit 12 is constituted by resistances R1 to R4 connected in series, and relay contacts RL101 to RL104 connected to the resistances R1 to R4 in parallel. The relay contacts RL101 to RL104 are also called as switch circuits. Each of the relay contacts RL101 to RL104 is operable to be switched between two states i.e. a short-circuited state (a-side) and an opened state (b-side).

In the exemplary embodiment, resistance values r1 to r4 of the resistances R1 to R4 differ from each other. Alternatively, all the resistance values of the resistances R1 to R4 may be the same as each other. The relay contacts RL101 to RL104 respectively correspond to the relay contacts RL1 to RL4 in the power feed line contact circuit 111. When the relay contacts RL1 to RL4 are switched to a-side, the relay contacts RL101 to RL104 are switched to a-side. When the relay contacts RL1 to RL4 are switched to b-side, the relay contacts RL101 to RL104 are switched to b-side. In this way, the operations of the relay contacts RL101 to RL104 are associated with the operations of the relay contacts RL1 to RL4. As the result, the resistance value of the variable resistance unit 12 is changed in conjunction with the operations of the relay contacts RL1 to RL4.

Figure 4:
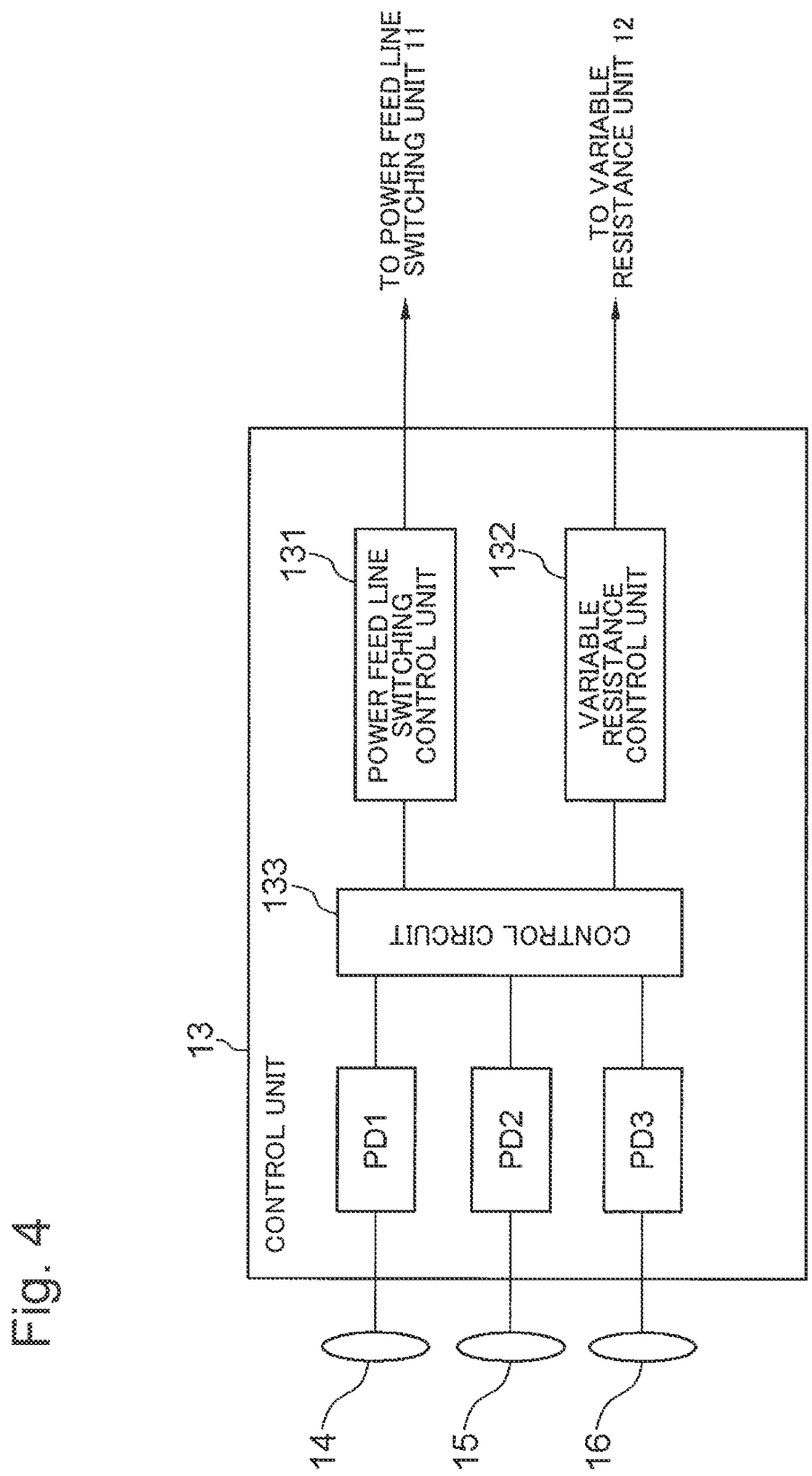
FIG. 4 is a block diagram illustrating a configuration example of a control unit 13.

Referring to FIG. 4, the control unit 13 is provided with three photodiodes PD1 to PD3, a power feed line switching control unit 131, a variable resistance control unit 132, and a control circuit 133. In FIG. 4, illustration of connecting paths among the control unit 13, the variable resistance unit 12, and the power feed line switching unit 11 is omitted.

The photodiodes PD1 to PD3 apply photoelectric conversion to a control signal transmitted from the terminal stations 21 to 23 via the optical fibers 51 to 53 and detected by the photocouplers 14 to 16. The control circuit 133 supplies the control signal which has been converted into an electric signal by the photodiodes PD1 to PD3 to the power feed line switching control unit 131 and to the variable resistance control unit 132.

The power feed line switching control unit 131 switches the states of the relay contacts RL1 to RL4 in the power feed line contact circuit 111 in accordance with a control signal supplied from the control circuit 133. More specifically, the control signal includes the identifier of a relay contact to be switched, and state information indicating the state (a-side or b-side) of the relay contact after the switching. The power feed line switching control unit 131 switches the state of the relay contact identified by the identifier in the control information to the state indicated by the state information in the control information.

The variable resistance control unit 132 switches the states of the relay contacts RL101 to RL104 in the variable resistance unit 12 in accordance with a control signal supplied from the control circuit 133. More specifically, the variable resistance control unit 132 switches the state of the relay contact in the variable resistance unit 12, which is associated with the relay contact in the power feed line contact circuit 111 identified by the identifier in a control signal to the state indicated by the state information in the control signal. For instance, when the identifier in a control signal is ID3 indicating the relay contact RL3, the variable resistance control unit 132 switches the state of the relay contact RL103 to the state indicated by the state information in the control signal.

The power feed line switching control unit 131 and the variable resistance control unit 132 are implementable by a CPU (Central Processing Unit). In this case, for instance, the following configuration is proposed. A disc, a semiconductor memory, or another recording medium recorded with a program which causes the CPU to function as the power feed line switching control unit 131 and the variable resistance control unit 132 is prepared. Then, the program is allowed to be read by the CPU. Controlling the operation of the CPU itself in accordance with the read program makes it possible to implement the power feed line switching control unit 131 and the variable resistance control unit 132 on the CPU itself.

Figure 5:
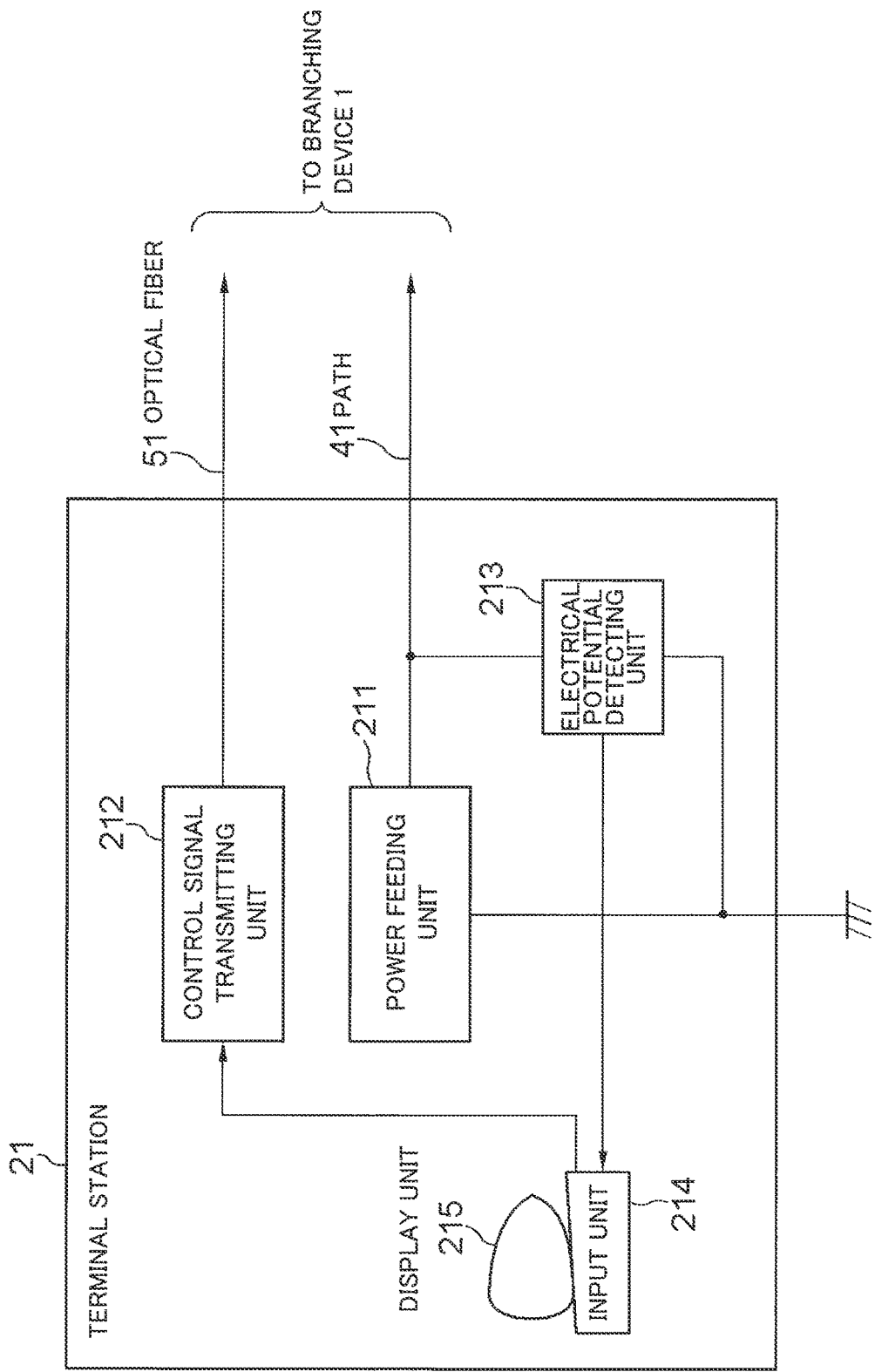
FIG. 5 is a block diagram illustrating a configuration example of a terminal station 21.

Referring to FIG. 5, the terminal station 21 is provided with a power feeding unit 211, a control signal transmitting unit 212, an electrical potential detecting unit 213, an input unit 214 such as a keyboard, and a display unit 215 such as an LCD. Note that the terminal stations 22 and 23 also have the same configuration as described above.

The power feeding unit 211 supplies constant direct current to the branching device 1 via the path 41 constituting a power feed line.

The control signal transmitting unit 212 generates a control signal for switching the states of the relay contacts RL1 to RL4 in the power feed line contact circuit 111 in accordance with a command to be input from the input unit 214 by the manager, and transmits the control signal to the branching device 1 via the optical fiber 51. In the exemplary embodiment, a control signal includes the identifier of a relay contact to be switched, and state information indicating the state of the relay contact after the switching. The control signal, however, is not limited to the above.

The electrical potential detecting unit 213 detects an electrical potential (ground potential) of the path 41, and displays the detection result on the display unit 215.

Next, an operation of the exemplary embodiment is explained in details.

It is assumed that, for example, the states of the relay contacts RL1 to RL4 in the power feed line contact circuit 111, and the states of the relay contacts RL101 to RL104 in the variable resistance unit 12 are respectively as illustrated in FIG. 2 and FIG. 3, and that the polarities of the terminal stations 21, 22, and 23 relating to power supply are respectively (+), (−), and (−). In this state, power supply is performed by the following two routes. The first route is from terminal station 21 (+)→path 41→relay contact RL1→diode D1→variable resistance unit 12→control unit 13→diode D4→relay contact RL2→path 42→terminal station 42 (−). The second route is from sea ground 24→relay contact RL3→path 43→terminal station 23 (−).

For instance, when a failure has occurred in the path 42 during power supply by the aforementioned two routes, the following operation is performed.

At first, the manager of the terminal station 21 inputs, from the input unit 214, a control signal transmission command including the identifier ID4 of the relay contact RL4 to be switched, and state information (a-side) indicating the state of the relay contact RL4 after the switching. Then, the control signal transmitting unit 212 generates a control signal including the identifier ID4 and the state information (a-side), and transmits the control signal to the branching device 1 via the optical fiber 51.

The control signal is input to the control unit 13 via the photocoupler 14, and is subjected to photoelectric conversion by the photodiode PD1. Thereafter, the control signal is input to the power feed line switching control unit 131 and to the variable resistance control unit 132.

Then, the power feed line switching control unit 131 switches the relay contact RL4 of the power feed line contact circuit 111 to a-side. Further, the variable resistance control unit 132 switches the relay contact RL104 to a-side.

In response to switching the relay contact RL4 to a-side, a power supply route from the terminal station 21 (+)→path 41→relay contact RL1→diode D1→variable resistance unit 12→control unit 13→diode D8→relay contact RL4→relay contact RL3→path 43→terminal station 43 (−) is formed. Further, switching the relay contacts RL4 and RL104 to a-side changes the resistance value of the variable resistance unit 12 from "r3+r4" to "r3". Then, the electrical potential of the path 41 to be detected by the electrical potential detecting unit 213 of the terminal station 21 is changed. Thus, the manager can confirm that switching of the relay contact RL4 is completed.

Thereafter, the manager of the terminal station 21 inputs, from the input unit 214, a control signal transmission command including the identifier ID3 of the relay contact RL3 in the power feed line contact circuit 11, and state information (a-side). The control signal transmitting unit 212 transmits a control signal including the identifier ID3 and the state information (a-side) to the branching device 1 in accordance with the control signal transmission command.

Then, the power feed line switching control unit 131 in the branching device 1 switches the relay contact RL3 in the power feed line contact circuit 111 to a-side, and the variable resistance control unit 132 switches the relay contact RL103 in the variable resistance unit 12 to a-side. In response to switching the relay contact RL3 to a-side, a power supply route from the terminal station 21 (+)→path 41→relay contact RL1→diode D1→variable resistance unit 12→control unit 13→diode D6→relay contact RL3→path 43→terminal station 43 (−) is formed. Further, switching the relay contact RL103 to a-side changes the resistance value of the variable resistance unit 12 from "r3" to "0". Then, the electrical potential of the path 41 to be detected by the electrical potential detecting unit 213 of the terminal station 21 is changed. Thus, the manager can confirm that switching of the relay contact RL3 is completed.

Thereafter, the manager of the terminal station 21 inputs, from the input unit 214, a control signal transmission command including the identifier ID2 of the relay contact RL2 in the power feed line contact circuit 111, and state information (b-side). The control signal transmitting unit 212 transmits a control signal including the identifier ID2 and the state information (b-side) to the branching device 1 in accordance with the control signal transmission command.

Then, the power feed line switching control unit 131 in the branching device 1 switches the relay contact RL2 in the power feed line contact circuit 111 to b-side, and the variable resistance control unit 132 switches the relay contact RL102 in the variable resistance unit 12 to b-side. In response to switching the relay contact RL102 to b-side, the resistance value of the variable resistance unit 12 is changed from "0" to "r2". Then, the electrical potential of the path 41 to be detected by the electrical potential detecting unit 213 of the terminal station 21 is changed. Thus, the manager can recognize that switching of the relay contact RL2 is completed. Note that even after the relay contact RL2 is switched to b-side, a power supply route from the terminal station 21 (+)→path 41→relay contact RL1→diode D1→variable resistance unit 12→control unit 13→diode D6→relay contact RL3→path 43→terminal station 43 (−) is formed.

Thereafter, the manager of the terminal station 21 inputs, from the input unit 214, a control signal transmission command including the identifier ID4 of the relay contact RL4, and state information (b-side).

The control signal transmitting unit 212 transmits a control signal including the identifier ID4 and the state information (b-side) to the branching device 1 in accordance with the control signal transmission command.

Then, the power feed line switching control unit 131 in the branching device 1 switches the relay contact RL4 in the power feed line contact circuit 111 to b-side, and the variable resistance control unit 132 switches the relay contact RL104 in the variable resistance unit 12 to b-side. In response to switching the relay contact RL104 to b-side, the resistance value of the variable resistance unit 12 is changed from "r2" to "r2+r4". Then, the electrical potential of the path 41 to be detected by the electrical potential detecting unit 213 of the terminal station 21 is changed. Thus, the manager can recognize that switching of the relay contact RL4 is completed. Note that even after the relay contact RL4 is switched to b-side, a power supply route from the terminal station 21 (+)→path 41→relay contact RL1→diode D1→variable resistance unit 12→control unit 13→diode D6→relay contact RL3→path 43→terminal station 43 (−) is formed. In this way, switching of a power feed line is completed.

In the exemplary embodiment, a control signal is transmitted from the terminal station 21 to the branching device 1. Alternatively, a control signal may be transmitted from the terminal station 22 or from the terminal station 23 to the branching device 1.

[Advantageous Effects of First Exemplary Embodiment]

The exemplary embodiment has an advantageous effect that it is possible to check whether a relay contact in a power feed line contact circuit is normally operated. This is because a variable resistance unit configured such that a resistance value of the variable resistance unit is changed, each time the state of a relay contact in a power feed line contact circuit is changed, is disposed in a portion of a path which constitutes a power feed line and which is commonly used before and after the power feed line is switched.

[Second Exemplary Embodiment of the Invention]

Next, the second exemplary embodiment of the invention is explained. The exemplary embodiment is characterized in that the configuration of the exemplary embodiment is simplified, as compared with the first exemplary embodiment.

Figure 6:
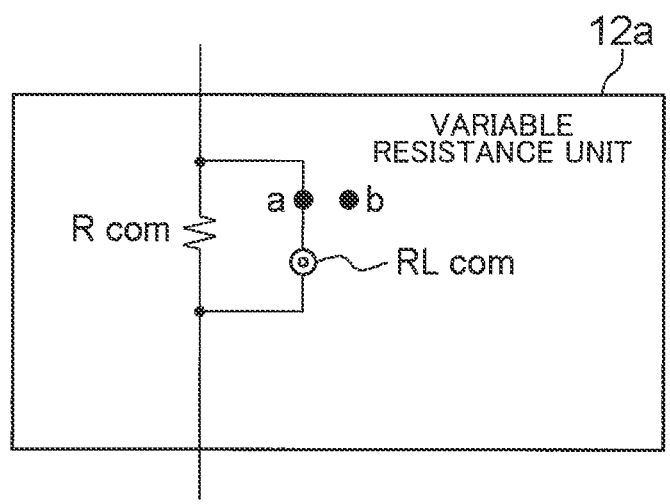
Figure 7:
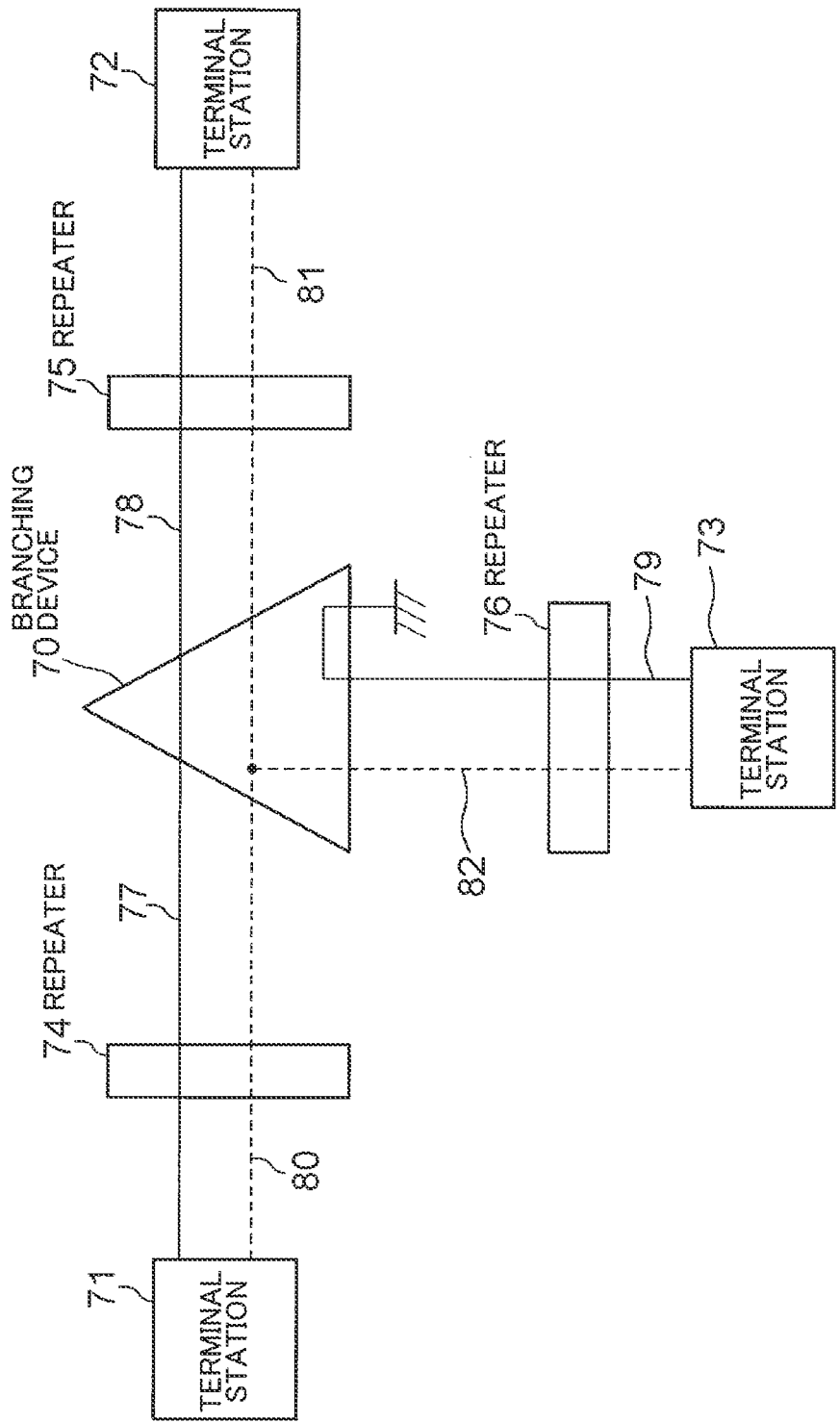
FIG. 7 is a block diagram for explaining the background art.

In the exemplary embodiment, a variable resistance unit 12a illustrated in FIG. 6 is used, in place of the variable resistance unit 12 illustrated in FIG. 3. Referring to FIG. 6, the variable resistance unit 12a is constituted by a resistance Rcom, and a relay contact RLcom connected to the resistance Rcom in parallel. The relay contact RLcom is operable to be switched between two states i.e. a short-circuited state (a-side) and an opened state (b-side).

Further, in the exemplary embodiment, a variable resistance control unit 132 performs the following operation, in place of the aforementioned operation. The variable resistance control unit 132 is internally provided with a state storage unit (not illustrated) which records the state (a-side or b-side) of the relay contact RLcom. In response to receiving a control signal for switching the states of relay contacts RL1 to RL4 in a power feed line contact circuit 111 from terminal stations 21 to 23, the variable resistance control unit 132 switches the state of the relay contact RLcom to a state opposite to the state recorded in the state storage unit. Thereafter, the variable resistance control unit 132 changes the content of the state storage unit to the state of the relay contact RLcom after the switching. In this way, each time the relay contacts RL1 to RL4 are operated, the variable resistance control unit 132 alternately switches the states of the relay contact RLcom between the two states i.e. a short-circuited state (a-side) and an opened state (b-side).

[Advantageous Effects of Second Exemplary Embodiment]

The exemplary embodiment has an advantageous effect that it is possible to configure the branching device 1 in an economically advantageous manner, in addition to the advantageous effects obtained in the first exemplary embodiment.

<Supplementary Notes>

A part or all of the exemplary embodiments may be described as the following Supplementary Notes. However, the invention is not limited by the following.

(Supplementary Note 1)

A branching device including a power feed line contact circuit provided with a plurality of contacts, and configured to switch a power feed line by changing states of the contacts, wherein a variable resistance unit configured such that a resistance value of the variable resistance unit is changed, each time the state of each of the contacts is changed, is interposed in a common path portion to be commonly used in the path constituting the power feed line before and after the power feed line is switched.

(Supplementary Note 2)

The branching device according to Supplementary Note 1, further including:

a control unit which changes the state of the contact of the power feed line contact circuit, and changes the resistance value of the variable resistance unit in accordance with a control signal to be transmitted from a terminal station.

(Supplementary Note 3)

The branching device according to Supplementary Note 1 or 2, wherein the variable resistance unit includes a resistance interposed in the common path portion, and a relay contact connected to the resistance in parallel, and operable to be switched between a short-circuited state and an opened state.

(Supplementary Note 4)

The branching device according to Supplementary Note 1 or 2, wherein the variable resistance unit includes a plurality of resistances interposed in the common path portion, and connected in series, and a relay contact for each of the resistances, the relay contact being connected to the corresponding one of the resistances in parallel, and operable to be switched between a short-circuited state and an opened state.

(Supplementary Note 5)

The branching device according to Supplementary Note 3, wherein the control unit sets a state of the relay contact to a state different from a current state between a short-circuited state and an opened state, each time a control signal is transmitted from the terminal station.

(Supplementary Note 6)

The branching device according to Supplementary Note 4, wherein the control unit sets a state of the relay contact in conjunction with content of a control signal among the relay contacts to a state in conjunction with the content of the control signal between a short-circuited state and an opened state, each time the control signal is transmitted from the terminal station.

(Supplementary Note 7)

The branching device according to any one of Supplementary Notes 1 to 6, further including:

a diode bridge circuit in which diode pairs for the respective contacts are connected in parallel, and contacts corresponding to connection portions between the respective diode pairs are connected, wherein the variable resistance unit is connected to the diode bridge circuit in parallel.

(Supplementary Note 8)

A submarine cable system including a branching device; and a plurality of terminal stations, wherein the branching device and each of the terminal stations are connected by an optical fiber, and a path constituting a part of a power feed line, each of the terminal stations is provided with a power feeding unit which supplies constant current to the path for connecting the each terminal station and the branching device, a control signal transmitting unit which transmits a control signal to the branching device via the optical fiber for connecting the each terminal station and the branching device, and an electrical potential detecting unit which detects an electrical potential of the path for connecting the each terminal station and the branching device, the branching device is provided with a power feed line contact circuit including a plurality of contacts, and configured to switch a power feed line by changing states of the contacts, a variable resistance unit interposed in a common path portion to be commonly used in the path constituting the power feed line before and after the power feed line is switched, and a control unit which changes states of the contacts, and changes resistance values of the variable resistance unit in accordance with the control signal.

(Supplementary Note 9)

The submarine cable system according to Supplementary Note 8, wherein the variable resistance unit includes a resistance interposed in the common path portion, and a relay contact connected to the resistance in parallel, and operable to be switched between a short-circuited state and an opened state.

(Supplementary Note 10)

The submarine cable system according to Supplementary Note 8, wherein the variable resistance unit includes a plurality of resistances interposed in the common path portion, and connected in series, and a relay contact for each of the resistances, the relay contact being connected to the corresponding one of the resistances in parallel, and operable to be switched between a short-circuited state and an opened state.

(Supplementary Note 11)

The submarine cable system according to Supplementary Note 9, wherein the control unit sets a state of the relay contact to a state different from a current state between a short-circuited state and an opened state, each time a control signal is transmitted from the terminal station.

(Supplementary Note 12)

The submarine cable system according to Supplementary Note 10, wherein the control unit sets a state of the relay contact in conjunction with content of a control signal among the relay contacts to a state in conjunction with the content of the control signal between a short-circuited state and an opened state, each time the control signal is transmitted from the terminal station.

(Supplementary Note 13)

A power feed line switching method including:

allowing a terminal station to transmit a control signal to a branching device via an optical fiber;

allowing the branching device to switch a power feed line by changing states of a plurality of contacts provided in a power feed line contact circuit, and to change resistance values of a variable resistance unit interposed in a common path portion to be commonly used in a path constituting a power feed line before and after the power feed line is switched in accordance with the control signal to be transmitted from the terminal station; and allowing the terminal station to detect an electrical potential of the power feed line.

(Supplementary Note 14)

The power feed line switching method according to Supplementary Note 13, wherein the variable resistance unit includes a resistance interposed in the common path portion, and a relay contact connected to the resistance in parallel, and operable to be switched between a short-circuited state and an opened state.

(Supplementary Note 15)

The power feed line switching method according to Supplementary Note 13, wherein the variable resistance unit includes a plurality of resistances interposed in the common path portion, and connected in series, and a relay contact for each of the resistances, the relay contact being connected to the corresponding one of the resistances in parallel, and operable to be switched between a short-circuited state and an opened state.

(Supplementary Note 16)

The power feed line switching method according to Supplementary Note 14, wherein the control unit sets a state of the relay contact to a state different from a current state between a short-circuited state and an opened state, each time a control signal is transmitted from the terminal station.

(Supplementary Note 17)

The power feed line switching method according to Supplementary Note 15, wherein the control unit sets a state of the relay contact in conjunction with content of a control signal among the relay contacts to a state in conjunction with the content of the control signal between a short-circuited state and an opened state, each time the control signal is transmitted from the terminal station.

(Supplementary Note 18)

A program which causes a computer provided with a power feed line contact circuit including a plurality of contacts, and configured to switch a power feed line by changing states of the contacts, and a variable resistance unit interposed in a common path portion to be commonly used in a path constituting a power feed line before and after the power feed line is switched to function as a control unit which changes states of the contacts, and changes resistance values of the variable resistance unit in accordance with a control signal transmitted from a terminal station.

(Supplementary Note 19)

The program according to Supplementary Note 18, wherein in the branching device of claim 1 or 2, the variable resistance unit includes a resistance interposed in the common path portion, and a relay contact connected to the resistance in parallel, and operable to be switched between a short-circuited state and an opened state.

(Supplementary Note 20)

The program according to Supplementary Note 18, wherein the variable resistance unit includes a plurality of resistances interposed in the common path portion, and connected in series, and a relay contact for each of the resistances, the relay contact being connected to the corresponding one of the resistances in parallel, and operable to be switched between a short-circuited state and an opened state.

(Supplementary Note 21)

The program according to Supplement Note 19, wherein the control unit sets a state of the relay contact to a state different from a current state between a short-circuited state and an opened state, each time a control signal is transmitted from the terminal station.

(Supplementary Note 22)

The program according to Supplementary Note 20, wherein the control unit sets a state of the relay contact in conjunction with content of a control signal among the relay contacts to a state in conjunction with the content of the control signal between a short-circuited state and an opened state, each time the control signal is transmitted from the terminal station.

This application claims the priority based on Japanese Patent Application No. 2013-173376 filed on Aug. 23, 2013 and receives benefit of the priority, and all of the disclosure of which is incorporated in the present specification.

INDUSTRIAL APPLICABILITY

The invention is applicable to a submarine cable system.

REFERENCE SIGNS LIST

1 . . . Branching device
11 . . . Power feed line switching unit
111 . . . Power feed line contact circuit
112 . . . Diode bridge circuit
RL1 to RL4 . . . Relay contact
D1 to D8 . . . Diode
12, 12a . . . Variable resistance unit
R1 to R4 . . . Resistance
RL101 to RL104 . . . Relay contact
13 . . . Control unit
131 . . . Power feed line switching control unit
132 . . . Variable resistance control unit
133 . . . Control circuit
PD1 to PD4 Photodiode
14 to 16 . . . Photocoupler
21 to 23 . . . Terminal station
211 . . . Power feeding unit
212 . . . Control signal transmitting unit
213 . . . Electrical potential detecting unit
214 . . . Input unit
215 . . . Display unit
31 to 33 . . . Repeater
41 to 43 . . . Path
51 to 53 . . . Optical fiber

The invention claimed is:

1. A branching unit coupled with a plurality of power feed lines, the branching unit comprising:
    a plurality of relay switches configured to switch an electric current path between the plurality of power feed lines; and
    a variable resistance unit comprising a plurality of linked switches and a plurality of resistances, the variable resistance unit being configured to change a connection among the plurality of linked switches and the plurality of resistances based on a status of the plurality of relay switches,
    wherein each of the plurality of relay switches comprises a connection terminal to switch the electric current path via one of the plurality of power feed lines to the variable resistance unit.

2. The branching unit according to claim 1, further comprising:
    a diode bridge circuit including a first diode pair, a second diode pair, a third diode pair, and a fourth diode pair connected in parallel, each of the first to fourth diode pairs being configured such that two diodes are connected in series to face the same direction, wherein
    the plurality of the power feed lines includes a first power feed line to be connected to a first terminal station, a second power feed line to be connected to a second terminal station, a third power feed line to be connected to a third terminal station, and a fourth power feed line to be connected to ground,
    the plurality of relay switches includes a first switch circuit which connects the first power feed line to one of a connection point between the two diodes of the first diode pair, and the fourth power feed line;
    a second switch circuit which connects the second power feed line to one of a connection point between the two diodes of the second diode pair, and the fourth power feed line;
    a third switch circuit which connects the third power feed line to one of a connection point between the two diodes of the third diode pair, and the fourth power feed line; and a fourth switch circuit which connects the fourth power feed line to a connection point between the two diodes of the fourth diode pair, and
    the variable resistance unit is connected to the first to fourth diodes pairs in parallel, and the resistance values thereof are changed in conjunction with the operations of the first to fourth switch circuits.

3. The branching unit according to claim 2, further comprising:
    a control unit configured to change states of the first to fourth switch circuits, and to change the resistance values of the plurality of resistances in accordance with a control signal to be transmitted from the first terminal station to the third terminal station.

4. The branching unit according to claim 2, wherein:
    the variable resistance unit includes
    a resistance, and
    a fifth switch circuit connected to the resistance in parallel, and configured to alternately switch the states between a short-circuited state and an opened state, each time the first to fourth switch circuits are operated.

5. The branching unit according to claim 2, wherein:
    the variable resistance unit includes a first resistance, a second resistance, a third resistance, and a fourth resistance connected in series,
    a fifth switch circuit connected to the first resistance in parallel, and configured to switch the state in conjunction with the operation of the first switch circuit,
    a sixth switch circuit connected to the second resistance in parallel, and configured to switch the state circuit in conjunction with the operation of the second switch circuit,
    a seventh switch circuit connected to the third resistance in parallel, and configured to switch the state in conjunction with the operation of the third switch circuit, and
    an eighth switch circuit connected to the fourth resistance in parallel, and configured to switch the state in conjunction with the operation of the fourth switch circuit.

6. A power feed line switching method performed by the branching unit according to claim 1, the method comprising:
    changing resistance values of the plurality of resistances of the variable resistance unit in conjunction with operations of the switch circuits.

7. A branching unit configured to be connected to a plurality of optical fibers configured to be connected to a plurality of terminal stations, and configured to be connected to a plurality of power feed lines, the branching unit comprising:
    a power feed line switching circuit configured to switch an electric current path among the plurality of power feed lines, wherein the power feed line switching circuit includes:
    a plurality of relay switches configured to switch the electric current path between the plurality of power feed lines, and
    a variable resistance unit comprising a plurality of linked switches and a plurality of resistances, the variable resistance unit being configured to change a connection among the plurality of linked switches and the plurality of resistances based on a status of the plurality of relay switches, wherein each of the plurality of relay switches comprises a connection terminal to switch the electric current path via one of the plurality of power feed lines to the variable resistance unit.

8. A submarine cable system comprising:

a plurality of terminal stations; and a branching device to be connected to a plurality of optical fibers to be connected to the plurality of terminal stations, and to be connected to a plurality of power feed lines, wherein:

the branching device includes a power feed line switching circuit which switches connection states among the plurality of power feed lines, the power feed line switching circuit includes a plurality of switch circuits which switch connection states among the plurality of power feed lines, and a variable resistance unit disposed on connecting paths between the plurality of power feed lines, and configured such that resistance values of the variable resistance unit are changed in conjunction with operations of the plurality of switch circuits, at least one of the plurality of terminal stations includes:

a power feeding unit which supplies constant current to a power feed line interposed between the branching device and the at least one terminal station, a control signal transmitting unit which transmits a control signal for switching the plurality of switch circuits with respect to the branching device, and an electrical potential detecting unit which detects an electrical potential of the power feed line disposed between the branching device and the at least one terminal station.

* * * * *